No. 644,318. Patented Feb. 27, 1900.
W. T. M. BRUNNEMER.
AGRICULTURAL IMPLEMENT.
(Application filed July 12, 1899.)
(No Model.)
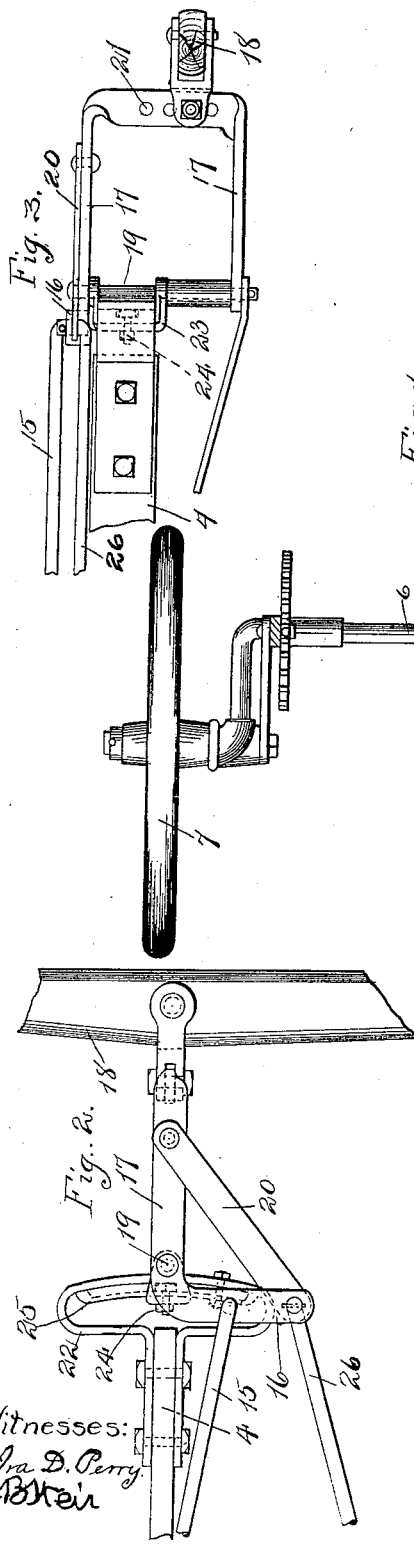
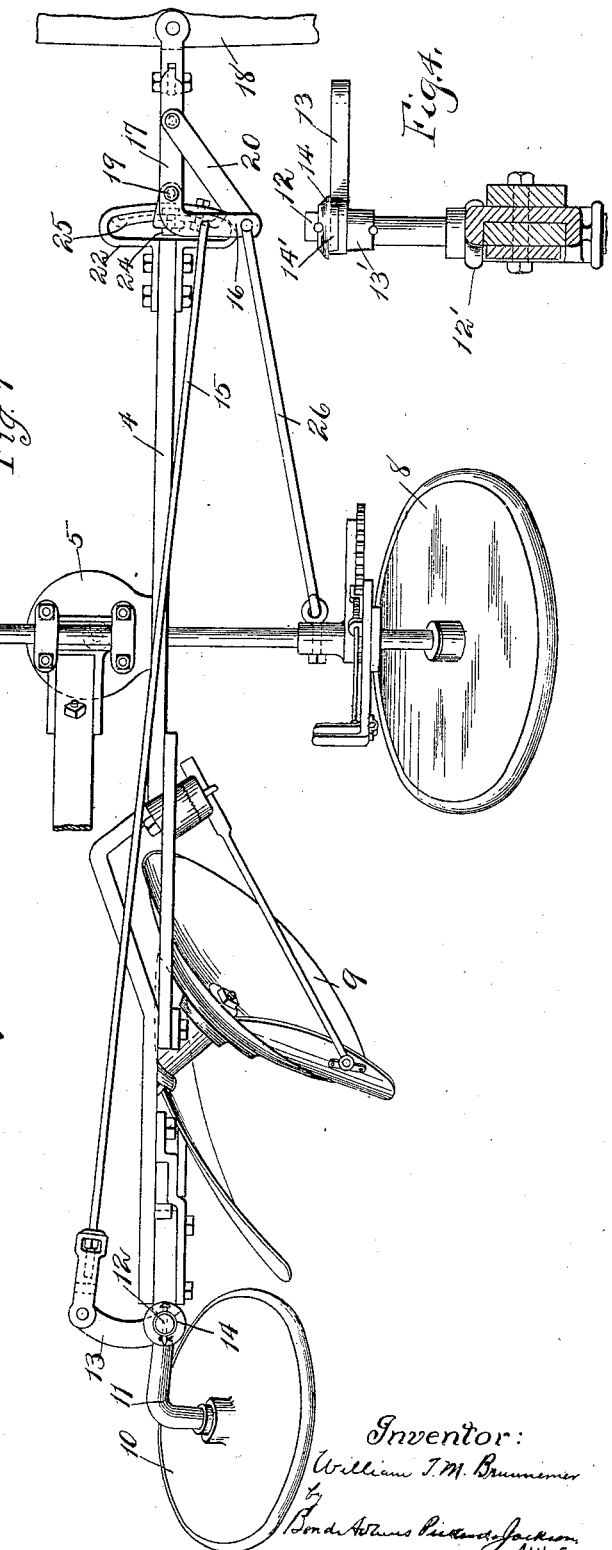
Witnesses:
Ira D. Perry
J. B. Keir
Inventor:
William T. M. Brunnemer
by Bond Adams Pickard & Jackson
Att'ys

United States Patent Office.

WILLIAM T. M. BRUNNEMER, OF BRADLEY, ILLINOIS, ASSIGNOR TO THE DAVID BRADLEY MANUFACTURING COMPANY, OF CHICAGO, ILLINOIS.

AGRICULTURAL IMPLEMENT.

SPECIFICATION forming part of Letters Patent No. 644,318, dated February 27, 1900.

Application filed July 12, 1899. Serial No. 723,591. (No model.)

*To all whom it may concern:*

Be it known that I, WILLIAM T. M. BRUNNEMER, a citizen of the United States, residing at Bradley, in the county of Kankakee and State of Illinois, have invented certain new and useful Improvements in Agricultural Implements, of which the following is a specification, reference being had to the accompanying drawings.

My invention relates to agricultural implements of the class used for opening a furrow, and has more particularly to do with implements provided with a caster-wheel arranged back of the furrow-opening devices and provided with controlling mechanism by which the caster-wheel is held in operative position when the machine is at work and is permitted to turn in the proper direction when the machine is turned, such controlling mechanism involving the use of a rod or brace extending from an arm connected with the caster-wheel support and with the draft devices.

My invention, generally stated, consists in providing means whereby the draft of the team counteracts the normal tendency of the caster-wheel to turn toward the land side.

My invention also consists of certain features of construction, which will be hereinafter pointed out.

That which I regard as new will be set forth in the claims.

In the accompanying drawings, Figure 1 is a plan view of my improvements as applied to an implement of the type illustrated and described in my application filed May 6, 1899, Serial No. 715,773, in which a tie rod or brace is used as a part of the controlling mechanism and the axle of the machine is arranged to swing on a vertical pivot. Fig. 2 is an enlarged plan view of the front end of the frame of the machine and a part of the draft devices. Fig. 3 is a side elevation of the same; and Fig. 4 is a view of the rear part of the beam, illustrating also the caster-wheel spindle.

Referring to the drawings, 4 indicates a beam, and 5 a plate carried thereby, to which the axle 6 is pivoted.

7 indicates the land-wheel, and 8 the furrow-wheel, which are mounted on the ends of the shaft 6. Suitable mechanism is provided for effecting the usual adjustments in the axle 6.

9 indicates the furrow-opener, which in the construction illustrated is a disk and is carried by the beam 4. One or more furrow-openers may be provided.

10 indicates the caster-wheel, which is arranged back of the furrow-opening devices and is mounted on a support 11, having a vertical spindle or shaft 12, which is fitted in a suitable bearing 12' at the rear end of the beam 4.

13 indicates a lever which is loosely mounted upon the spindle 12 near its upper end and is held up in position by a collar 13' or other suitable means.

14 indicates a disk which is mounted at the upper end of the spindle 12 of the caster-wheel and is secured thereto, so as to rotate therewith. Said disk is provided with a depending lug or segment 14', which is adapted to engage the lever 13 at its forward side, so that under certain circumstances the lever 13 is caused to rotate with said spindle. This arrangement is fully illustrated and described in my application Serial No. 715,773, above referred to, and, so far as the said specific construction is concerned, is not a part of my present invention, as various other arrangements to the same end may be employed. The lever 13 is connected in the construction illustrated by a tie rod or brace 15 to a transverse or laterally-extending arm 16 of a draft device or bracket 17, which is pivotally secured to the forward end of the beam 4, the forward end of said bracket 17 being adapted to receive the doubletree 18. The bracket 17 is pivoted upon a pin 19, as shown in Figs. 1 and 3, so as to swing in a horizontal plane. The result of this construction is that the backward pull upon the rod 15, caused by the tendency of the caster-wheel to turn in toward the land under the stress of plowing, is transmitted to the laterally-extending arm 16 of the bracket 17, and consequently has a tendency to rock the bracket 17 upon its pivot. This tendency to rock, however, is normally neutralized by the draft of the team, which is applied directly to said bracket from the doubletree. When the machine is to be turned to the left, the lateral arm 16 of the bracket 17 is moved forward by the rocking of said bracket about its pivot, thereby carrying the lever 15 forward and turning the caster-wheel away from the land, so that it properly follows the machine. When the team is turned to the right, the bar 15 is moved backward, carrying the lever 13 away from the depending lug of the disk 14 and permitting the caster-wheel to turn in the opposite direction.

20 indicates a brace which connects the bracket 17 with the arm 16, in order to strengthen said arm. The doubletree 18 may be vertically adjusted, as it is secured in one of a number of holes 21 in the vertical portion of the draft-bracket 17, which, as illustrated in Fig. 3, is in the form of a stirrup. The bracket 17 may be transversely adjusted, as it is secured in a transversely-arranged frame 22, secured at the forward end of the beam 4, as shown in Fig. 1. The specific devices by which said bracket 17 is secured in its different positions of adjustment consist of a stirrup 23, carried by the pivot 19 of the bracket 17, which, as shown in Figs. 1 and 3, passes through the frame 22 and is secured in different positions by a bolt 24, which passes through said stirrup and through a slotted bar 25 within the frame 22. The land and furrow wheels are also adjusted to conform to change of direction of the team by a connecting-rod 26, which is connected to the transverse arm 16 of the bracket 17 and to the axle 6 near the furrow-wheel 8, as shown in Fig. 1. Thus the position of all the wheels is controlled by the draft-bracket.

While I have illustrated my invention as applied to an implement similar to that illustrated in my prior application above referred to, it should be understood that so far as the broad features of my invention are concerned I do not restrict myself to their application to a machine of that type. Furthermore, I do not restrict myself to the specific devices of the construction illustrated and described except in so far as they are specifically claimed, as various modifications may be made without departing from my invention.

That which I claim as my invention, and desire to secure by Letters Patent, is—

1. In an agricultural implement, the combination of a frame, a furrow-opener, a caster-wheel back of the furrow-opener, a draft device which receives the draft of the team and means connected with said draft device for holding said caster-wheel normally in operative position and for releasing said caster-wheel so that it may turn independently when the line of draft is altered, substantially as described.

2. In an agricultural implement, the combination of a frame, a furrow-opener, a caster-wheel back of the furrow-opener, a draft device which receives the draft of the team, said draft device being pivotally supported and means connecting said draft device and caster-wheel for holding said caster-wheel normally in operative position, and adapted to permit said caster-wheel to turn when the direction of the draft is varied, substantially as described.

3. In an agricultural implement, the combination of a beam, a draft-bracket at the forward end thereof pivoted to swing in a horizontal plane, an arm carried by said bracket and projecting at an angle thereto, a furrow-opener, a caster-wheel back of the furrow-opener, said caster-wheel having a laterally-extending arm, and a connection between the caster-wheel arm and said bracket-arm, whereby the position of the caster-wheel arm is controlled by the position of the bracket-arm, substantially as described.

4. In an agricultural implement, the combination of a beam, a transversely-adjustable bracket at the forward end thereof pivoted to swing in a horizontal plane, an arm carried by said bracket and projecting at an angle thereto, a furrow-opener, a caster-wheel back of the furrow-opener, said caster-wheel having a laterally-extended arm, and a connection between the caster-wheel arm and said bracket-arm whereby the position of the caster-wheel arm is controlled by the position of the bracket-arm, substantially as described.

5. In an agricultural implement, the combination of a frame, a furrow-opener, an axle pivoted to said frame, land and furrow wheels mounted on said axle, a caster-wheel back of the furrow-opener, a draft device, and means connecting said draft device and said axle, means connecting said draft device and said caster-wheel, said connecting means being arranged to vary the position of said axle and caster-wheel when the line of draft is altered, substantially as described.

6. In an agricultural implement, the combination of a frame, a furrow-opener, an axle pivoted to said frame, land and furrow wheels carried by said axle, a caster-wheel back of the furrow-opener, a draft-bracket at the forward end of said frame pivoted to swing in a horizontal plane, an arm carried by said bracket and projecting at an angle thereto, a laterally-projecting arm carried by the caster-wheel, a connection between the caster-wheel arm and said bracket-arm, and a connection between said bracket-arm and said axle whereby the position of said caster-wheel and of the land and furrow wheels is controlled by the position of said draft-bracket, substantially as described.

7. In an agricultural implement, the combination of a machine-frame, three wheels supporting said frame, a pivoted draft device, a laterally-extending arm connected therewith, and means operated by the swinging of said draft device for controlling the position of said wheels, substantially as described.

8. In an agricultural implement, the combination of a machine-frame, three wheels supporting said frame, a pivoted draft device which receives the draft of the team, a laterally-extending arm rigidly connected therewith, and means operated by the swinging of said draft device for controlling the position of said wheels, substantially as described.

9. In an agricultural implement, the combination of a machine-frame, land and furrow wheels and a rear caster-wheel supporting said frame, an adjustable draft device which receives the draft of the team, and means operated by change of position of the draft device for adjusting the position of said land and furrow wheels, and for releasing said caster-wheel to permit it to turn in either direction, substantially as described.

10. In an agricultural implement, the combination of a frame, an axle pivoted to said frame, land and furrow wheels mounted on said axle, a draft device extending normally substantially in the line of draft and means connecting said draft device and axle and operating to control the position of said axle, substantially as described.

11. In an agricultural implement, the combination of a frame, an axle pivoted to said frame, land and furrow wheels mounted on said axle, a caster-wheel, means normally holding the caster-wheel in operative position, and means operated by the team for adjusting the position of said axle when the line of draft is altered, and for releasing the caster-wheel, substantially as described.

12. In an agricultural implement, the combination of a frame, angularly-adjustable land and furrow wheels supporting said frame, a draft device which receives the draft of the team and normally lies in the line of draft, said draft device having a rigid laterally-extending arm, and means operated by variations of the line of draft for angularly adjusting said wheels, substantially as described.

WILLIAM T. M. BRUNNEMER.

Witnesses:
 JOHN L. JACKSON,
 HELEN M. COLLIN.